(12) United States Patent
Babin

(10) Patent No.: US 7,416,402 B2
(45) Date of Patent: Aug. 26, 2008

(54) SPRUE BUSHING ANTI-DROOL DEVICE

(75) Inventor: Denis Babin, Georgetown (CA)

(73) Assignee: Mold-Masters (2007) Limited, Georgetown Ontario (CA)

( * ) Notice: Subject to any disclaimer, the term of this patent is extended or adjusted under 35 U.S.C. 154(b) by 659 days.

(21) Appl. No.: 10/813,165

(22) Filed: Mar. 31, 2004

(65) Prior Publication Data

US 2004/0191357 A1  Sep. 30, 2004

Related U.S. Application Data

(60) Provisional application No. 60/458,410, filed on Mar. 31, 2003.

(51) Int. Cl.
  *B29C 45/20* (2006.01)

(52) U.S. Cl. .................................. 425/542; 425/562

(58) Field of Classification Search ................. 425/542, 425/562, 245, 246, 563–566, 570, 573; 264/328.1, 264/328.9
See application file for complete search history.

(56) References Cited

U.S. PATENT DOCUMENTS

| | | | |
|---|---|---|---|
| 2,514,390 A | 7/1950 | Hagen | |
| 2,928,125 A | 3/1960 | Smucker et al. | |
| 3,049,757 A | 8/1962 | Hagerborg | |
| 3,146,282 A | 8/1964 | Ninneman | |
| 3,270,115 A | 8/1966 | Nouel | |
| 3,315,899 A | 4/1967 | Quarve | |
| 3,719,310 A | 3/1973 | Hunten | |
| 3,758,248 A * | 9/1973 | Drazick | 425/145 |
| 3,902,665 A | 9/1975 | Hendry | |
| 3,934,626 A * | 1/1976 | Hall | 141/117 |
| 4,273,525 A * | 6/1981 | Reitan | 425/549 |
| 4,299,791 A | 11/1981 | Aoki | |
| 4,394,117 A * | 7/1983 | Taylor | 425/549 |
| 4,674,968 A | 6/1987 | Durst | |
| 4,678,427 A | 7/1987 | Fritzsche | |
| 4,768,283 A * | 9/1988 | Gellert | 29/611 |
| 4,899,435 A * | 2/1990 | Trakas | 29/611 |
| 4,917,594 A * | 4/1990 | Gellert et al. | 425/549 |
| 4,917,595 A | 4/1990 | Nakamura et al. | |
| 5,012,839 A | 5/1991 | Rogers et al. | |

(Continued)

FOREIGN PATENT DOCUMENTS

DE  1554847  1/1970

(Continued)

*Primary Examiner*—Philip C Tucker
*Assistant Examiner*—Dimple N Bodawala
(74) *Attorney, Agent, or Firm*—Medler Ferro PLLC

(57) ABSTRACT

An anti-drool mechanism suitable for use in an injection molding system is provided herein. An injection molding machine includes a retractable machine nozzle for injecting a melt stream into a manifold. Between the machine nozzle and the manifold is an anti-drool mechanism, which includes a melt passage and a fixed pin disposed within the melt passage. The fixed pin is sized so that the melt stream will flow around the pin. The fixed pin has a head portion configured to engage with the machine nozzle and includes a first sealing surface. An actuated shut-off collar is also disposed within the melt passage, surrounding the pin, and includes a second sealing surface configured to cut off the flow of the melt stream when in contact with the first sealing surface.

18 Claims, 4 Drawing Sheets

U.S. PATENT DOCUMENTS

| | | | |
|---|---|---|---|
| 5,094,603 A * | 3/1992 | Gellert | 425/130 |
| 5,151,025 A | 9/1992 | Muller | |
| 5,229,145 A | 7/1993 | Brown et al. | |
| 5,370,523 A | 12/1994 | Kushnir | |
| 5,458,843 A * | 10/1995 | Brown et al. | 264/297.2 |
| 5,460,510 A * | 10/1995 | Gellert | 425/562 |
| 5,464,579 A | 11/1995 | Brown et al. | |
| 5,470,219 A * | 11/1995 | Yokoyama et al. | 425/144 |
| 5,484,275 A | 1/1996 | Kushnir | |
| 5,720,433 A | 2/1998 | Forker | |
| 5,785,915 A * | 7/1998 | Osuna-Diaz | 264/328.9 |
| 5,955,121 A * | 9/1999 | Gellert et al. | 425/549 |
| 5,968,562 A | 10/1999 | Schad et al. | |
| 5,975,127 A | 11/1999 | Dray | |
| 6,062,841 A | 5/2000 | Gellert et al. | |
| 6,135,757 A | 10/2000 | Jenko | |
| 6,270,711 B1 * | 8/2001 | Gellert et al. | 264/255 |
| 6,348,171 B1 | 2/2002 | Dewar et al. | |
| 6,361,300 B1 | 3/2002 | Kazmer et al. | |
| 6,413,076 B1 * | 7/2002 | Dray, Sr. | 425/562 |
| 6,533,021 B1 * | 3/2003 | Shibata et al. | 164/312 |
| 6,585,505 B2 * | 7/2003 | Kazmer et al. | 425/145 |
| 6,739,863 B2 * | 5/2004 | Olaru | 425/564 |
| 6,835,060 B2 * | 12/2004 | Sicilia | 425/572 |
| 6,910,877 B2 * | 6/2005 | Berceanu et al. | 425/547 |
| 7,182,893 B2 * | 2/2007 | Olaru | 264/40.6 |
| 2002/0121713 A1 | 9/2002 | Moss et al. | |
| 2006/0204610 A1 | 9/2006 | Nakaya et al. | |

FOREIGN PATENT DOCUMENTS

| | | |
|---|---|---|
| JP | 55017569 A | 2/1980 |
| JP | 60168619 | 9/1985 |
| JP | 60240425 | 11/1985 |
| JP | 5185473 | 7/1993 |
| JP | 2003127186 | 5/2003 |
| WO | WO 99/54109 | 10/1999 |

* cited by examiner

SPRUE BUSHING ANTI-DROOL DEVICE

CROSS-REFERENCE TO RELATED APPLICATIONS

The present application claims the benefit under 35 U.S.C. §119(e) of, U.S. Provisional Application No. 60/458,410 filed Mar. 31, 2003. The disclosure of this referenced application is incorporated by reference herein in its entirety.

BACKGROUND OF THE INVENTION

1. Field of the Invention

This invention relates generally to injection molding systems and, more particularly, to the prevention of drool in an injection molding system.

2. Background of the Invention

In many injection molding systems available today, the systems comprise an injection molding machine having a machine nozzle making contact with a sprue bushing to transfer molten material to a mold via a runner system, such as a cold runner or a hot runner. In the event that the machine nozzle has to be disengaged from making contact with the sprue bushing molten plastic will drool backwards from the sprue bushing, and this will adversely affect the next shot of melt. This situation can happen in many applications, such as for example with shuttle molds, rotary molds, and stack molds.

Due to residual pressures in the system, molten material tends to leak, or "drool", from the sprue bushing at the end of the injection cycle, i.e., when the machine nozzle is retracted from the sprue bushing inlet. Not only does this drool waste material and increase production costs, but the drooled material may collect on the mold and prevent complete closing thereof or cause permanent damage thereto.

Many techniques and devices exist in the art that are designed to prevent or reduce drool in an injection molding system. Examples include various shut-off mechanisms located at the machine nozzle tip or spindle elements for use in a suck-back procedure. In many cases, the machine nozzle incorporates an anti-drool mechanism into its structure, as is described in U.S. Pat. No. 3,934,626 to Hall, incorporated herein in its entirety by reference thereto.

However, there exists a need to have an anti-drool mechanism that can be added as a modular component to existing injection molding systems, including stack molding systems.

SUMMARY OF THE INVENTION

Accordingly, an anti-drool mechanism suitable for use in an injection molding system using a retractable machine nozzle is provided herein. An injection molding machine has a machine nozzle for injecting a melt stream into a manifold. Between the machine nozzle and the manifold is an anti-drool mechanism, which includes a melt inlet configured to engage with the machine nozzle, a melt passage, and a fixed pin disposed within the melt passage. The fixed pin is sized so that the melt stream will flow around the pin. The fixed pin has a head configured to be received within the machine nozzle. An actuated shut-off collar is also disposed within the melt passage, surrounding the pin. The shut-off collar includes a sealing surface that is configured to cut off the flow of the melt stream into the melt passage and subsequently into the manifold melt channel when the sealing surface engages with a coordinating sealing surface on the head of the fixed pin.

BRIEF DESCRIPTION OF THE DRAWINGS/FIGURES

The accompanying drawings, which are incorporated herein and form a part of the specification, illustrate the present invention and, together with the description, further serve to explain the principles of the invention and to enable a person skilled in the pertinent art to make and use the invention.

DETAILED DESCRIPTION OF THE INVENTION

Specific embodiments of the present invention are now described with reference to the figures, where like reference numbers indicate identical or functionally similar elements.

Figure 4:
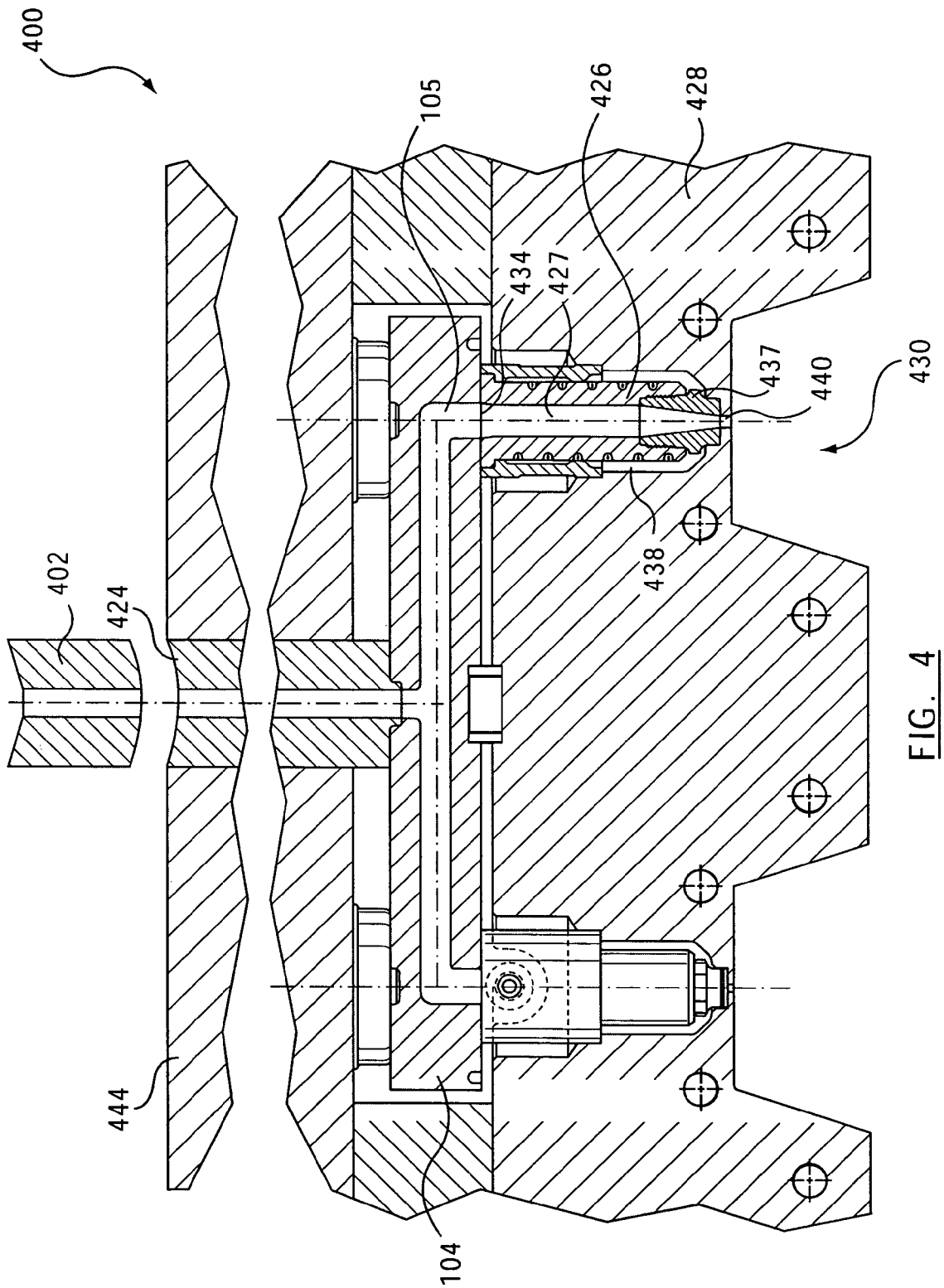
FIG. 4 is a sectional view of an injection molding apparatus that may be used with the present invention.

Referring first to FIG. 4, one example of an injection molding system 400 having a sprue bushing 424 within a back plate 444 is shown. The injection molding system includes a machine nozzle 402, which introduces a melt stream under pressure into the injection molding system via sprue bushing 424. From sprue bushing 424, melt flows into a manifold melt channel 105 provided in a hot runner manifold 104. In the injection molding system 400 depicted, manifold 104 allows the melt stream to be distributed through manifold outlets 434 into melt channels 427 provided in respective nozzles 426. Nozzles 426 are positioned within nozzle cutouts 438 of a mold plate 428. Each nozzle is in fluid communication with a mold cavity 430 via a mold gate 440 so that the melt stream may be injected through nozzle melt channel 427 and nozzle tip 437 into the mold cavities 430.

Figure 1:
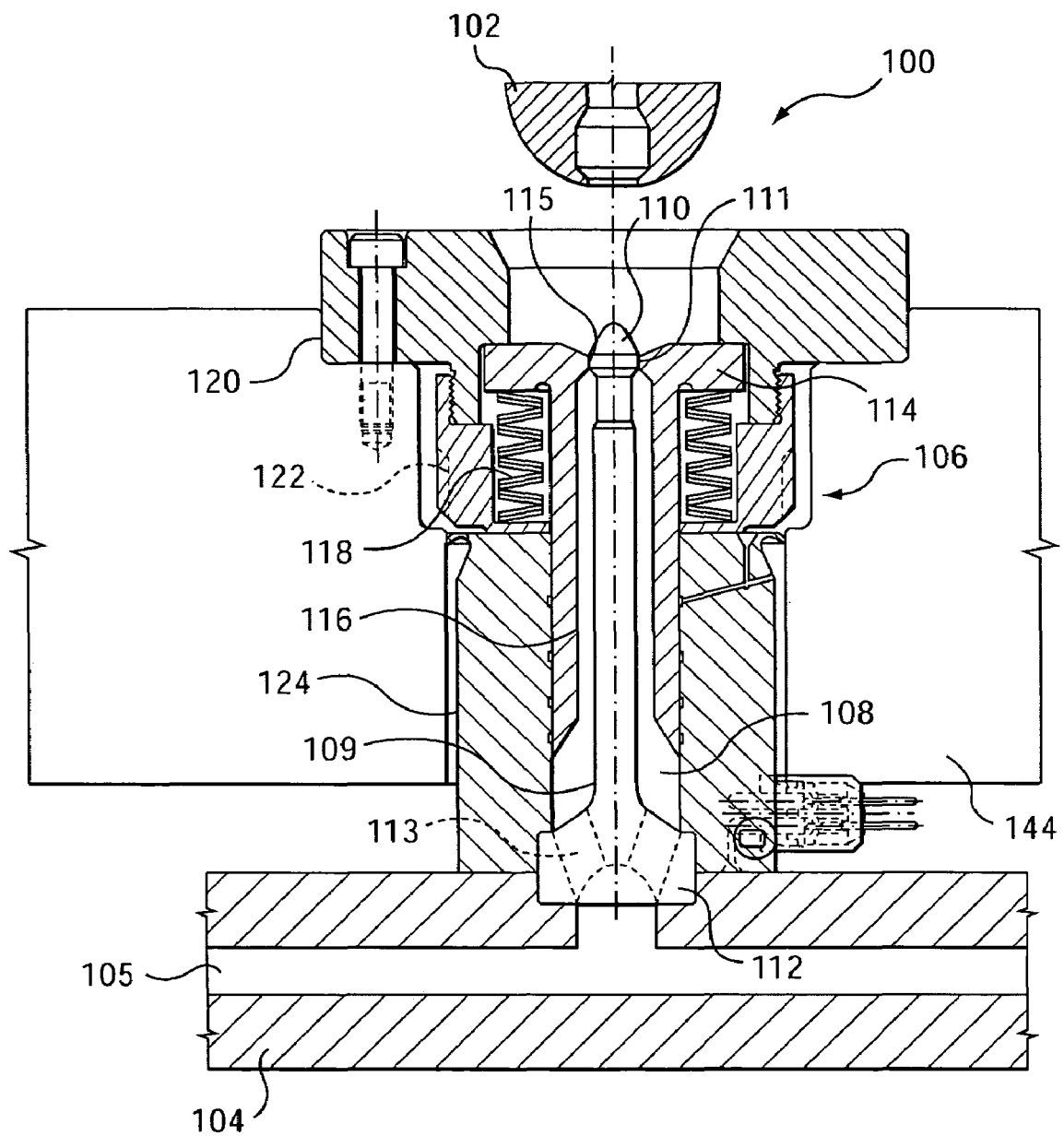
FIG. 1 is a sectional schematic view of an injection system according to the present invention.

Referring now to FIG. 1, one embodiment of an anti-drool mechanism 106 of an injection molding system 100 is shown. As described above, injection molding system 100 includes a machine nozzle 102, which introduces a melt stream into the injection molding system. In this embodiment, machine nozzle 102 engages anti-drool mechanism 106 positioned partially within a back plate 144. Anti-drool mechanism 106 cooperates with a sprue bushing 124 to control the flow of the melt stream into manifold 104. Manifold 104 then distributes the melt stream through a manifold melt channel 105 to a variety of mechanisms, including but not limited to a hot runner system, an injection nozzle, a mold, a stack mold, or a combination of these elements.

In the embodiment illustrated in FIG. 1, anti-drool mechanism 106 is shown in a closed position and is disposed between machine nozzle 102 and sprue bushing 124. Anti-drool mechanism 106 includes a fixed pin 109 disposed within a melt passage 108. Melt passage 108 is in fluid communication, at opposing ends thereof, with machine nozzle 102 and manifold melt channel 105. Fixed pin 109 includes a base portion 112 and includes a pin head portion 110. Base portion 112 is mountable to manifold 104. In this embodiment, base portion 112 does not obstruct the flow of melt through melt passage 108. Fluid communication of melt passage 108 with manifold melt channel 105 is maintained through base portion melt passages 113. Therefore, when machine nozzle 102 is engaged with anti-drool mechanism 106, melt flows from machine nozzle 102, around fixed pin 109, through base portion melt passages 113, and into manifold melt channel 105 for subsequent distribution to hot runner systems, injection nozzles, mold cavities, molds, or a stack mold system.

A shut-off collar 114 is disposed around fixed pin 109 at the end thereof nearest to machine nozzle 102. Shut-off collar 114 is movable, in that shut-off collar 114 can be manipulated towards manifold 104 and back to its original position by an actuation mechanism. While any actuation mechanism known in the art is appropriate for the present invention, such as pneumatic, hydraulic, electromechanical, or mechanical (e.g., cam and lever), shut-off collar 114 of one embodiment is spring-loaded, so that it is biased towards machine nozzle 102 by a biasing spring 118. This actuation will be described in greater detail below.

Shut-off collar 114 can have any shape that is capable of sealing the interface between machine nozzle 102 and fixed pin 109, but in an embodiment of the present invention shut-off collar 114 includes a ring-like structure with a sealing surface 115 at one end thereof. Sealing surface 115 is configured to prevent the flow of melt into anti-drool mechanism melt passage 108 by coming into contact with a coordinating sealing surface 111 on pin head portion 110. In order to seal melt passage 108 and prevent drool, the diameter of sealing surface 115 and the diameter of coordinating sealing surface 111 must be equal or approximately equal to each other.

Figure 2:
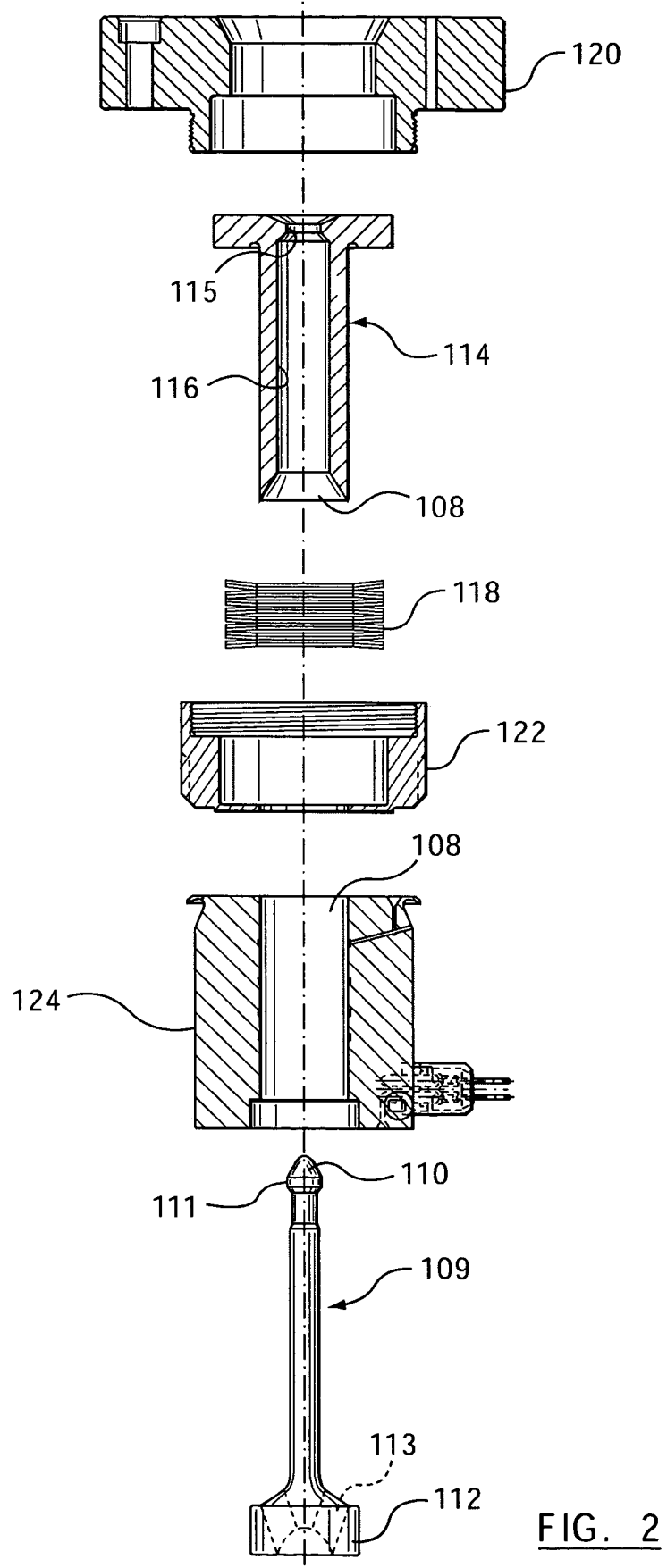
FIG. 2 is an exploded view of the anti-drool mechanism of FIG. 1.

In an embodiment of the present invention, shut-off collar 114 includes a sleeve 116 that extends into anti-drool mechanism melt passage 108. The sleeve 116 of shut-off collar 114 helps to guide the motion thereof. The shape of shut-off collar 114 can be seen more clearly in FIG. 2, an exploded view of this portion of injection molding system 100.

Biasing spring 118 can be any conventional spring known in the art, such as a series of stacked Belleville washers, a helical compression spring, or the like. Biasing spring 118 must have a spring constant sufficient to consistently return shut-off collar 114 to a closed position. Biasing spring 118 must also be sufficiently rigorous to withstand a high number of cyclic compressions.

Sealing surface 115 of shut-off collar 114 is disposed between a locating ring 120 and a stroke limiting nut 122. Locating ring 120 limits the motion of shut-off collar 114 in the direction of the machine nozzle 102, so as to ensure that biasing spring 118 correctly positions sealing surface 115 in contact with coordinating sealing surface 111 on pin head portion 110. Similarly, stroke limiting nut 122 limits the motion of shut-off collar 114 in the direction of manifold 104 to prevent unnecessary wear on biasing spring 118.

The functioning of anti-drool mechanism 106 will now be described in greater detail with reference to FIGS. 1 and 3. FIG. 1 shows anti-drool mechanism 106 in a first, closed position. Machine nozzle 102 is disengaged from pin head portion 110. In the closed position, machine nozzle 102 and shut-off collar 114 can have no contact, as shown, or, alternatively, the contact may be maintained, as long as sealing surface 115 of shut-off collar 114 is in contact with corresponding sealing surface 111 of pin head portion 110. Biasing spring 118 is in a neutral, fully expanded position. As such, anti-drool mechanism melt passage 108 is closed so that melt may not flow therethrough.

Figure 3:
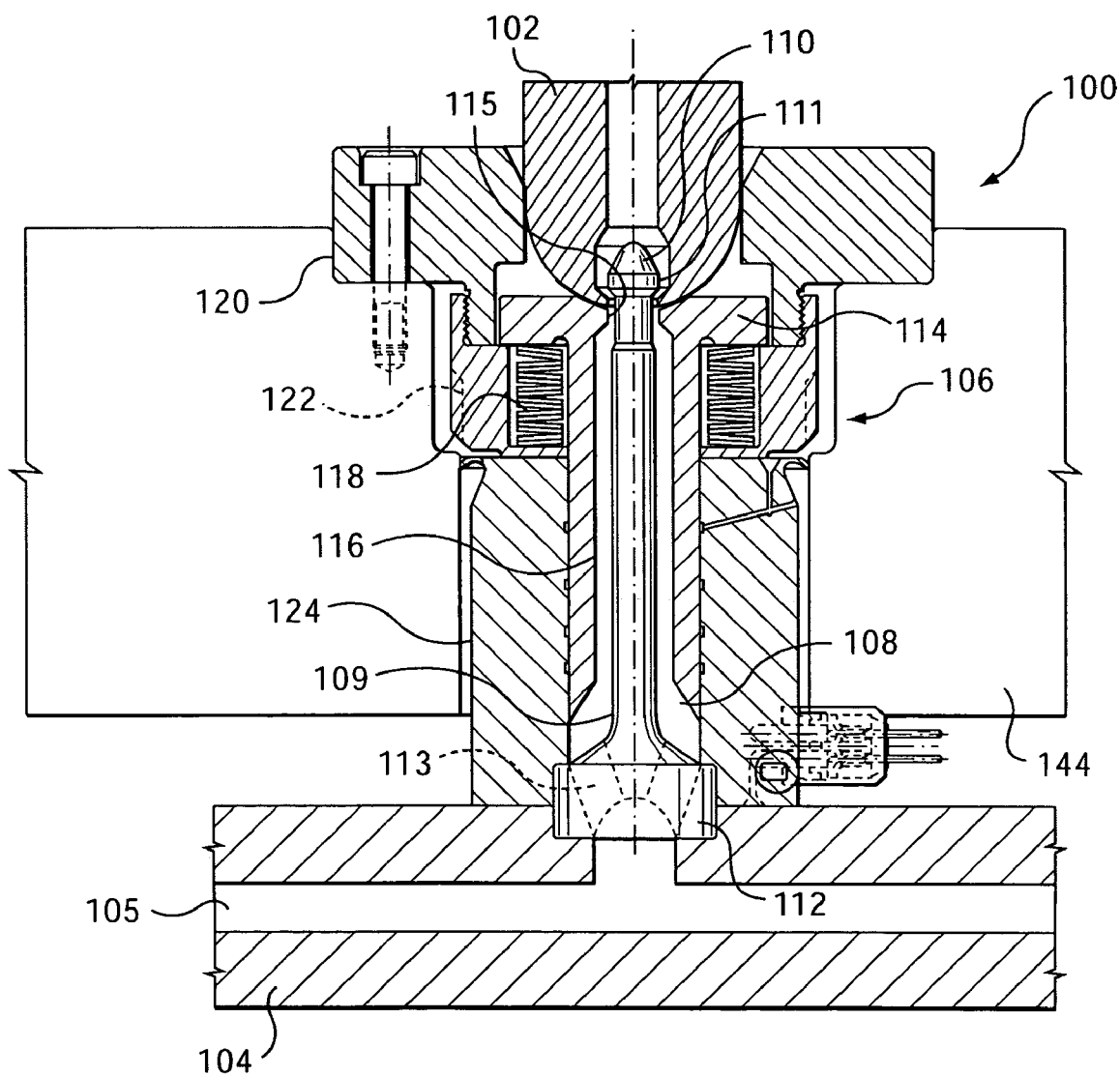
FIG. 3 is a sectional schematic view of the injection molding system according to the present invention with the machine nozzle engaged.

FIG. 3 shows anti-drool mechanism in a second, open position. To achieve this open position, machine nozzle 102 advances forward and pushes on shut-off collar 114. Shut-off collar 114 slides in the direction of manifold 104, thereby compressing biasing spring 118 and storing therein the energy to return shut-off collar 114 to the closed position shown in FIG. 1 upon the retraction of machine nozzle 102.

As shut-off collar 114 slides forward, contact between sealing surface 115 and coordinating sealing surface 111 is broken, creating a gap, or a flow space, through which melt can flow from machine nozzle 102, through anti-drool mechanism melt passage 108, and into manifold melt channel 105.

In this embodiment, at the end of the melt shot, machine nozzle 102 retracts to the position shown in FIG. 1. Upon removal of the force exerted on shut-off collar 114 by machine nozzle 102, biasing spring 118 releases the energy stored therein and returns shut-off collar 114 to the position shown in FIG. 1. Contact between sealing surface 115 and coordinating sealing surface 111 is re-established, thereby preventing any melt in melt passage 108 from flowing out, i.e., preventing drooling from system 100.

The embodiment described herein includes the use of a retractable machine nozzle. However, the present invention is not so limited. When a non-retractable machine nozzle is used, or when the operation does not require that the machine nozzle be retracted between shots, one of the other actuation mechanisms should be used, such as a pneumatic, hydraulic, electromechanical, or mechanical actuation system. As the motion of the machine nozzle will not be available to compress and release the spring of the spring-loaded shut-off collar, an actuation mechanism with external control is necessary.

While various embodiments of the present invention have been described above, it should be understood that they have been presented by way of example only, and not limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the following claims and their equivalents. All patents and publications discussed herein are incorporated in their entirety by reference thereto.

What is claimed is:

1. An injection molding system comprising:
   an injection molding machine including a machine nozzle for injecting a melt stream;
   a manifold having at least one manifold melt inlet for receiving the melt stream and having at least one melt channel for distributing the melt stream; and
   an anti-drool mechanism positioned between the machine nozzle and the manifold melt inlet including,
      a melt passage for communicating the melt stream from the machine nozzle to the manifold melt inlet,
      a fixed pin disposed entirely within the melt passage and sized so that the melt stream flows around the pin, the pin having a head portion, and
      a movable shut-off collar disposed at least partially within the melt passage and surrounding the pin, wherein a sealing surface of the shut-off collar contacts a sealing surface of the head portion of the pin to stop the flow of the melt stream through the melt passage.

2. The system according to claim 1, wherein the shut-off collar is spring-loaded.

3. The system according to claim 2, wherein the shut-off collar is moved downstream by engagement with the machine nozzle such that contact between the shut-off collar sealing surface and the pin head portion sealing surface is broken to allow the melt stream to flow through the anti-drool mechanism.

4. The system according to claim 3, wherein the head portion of the pin is received within the machine nozzle when the shut-off collar is moved downstream by engagement with the machine nozzle.

5. The system according to claim 1, wherein the shut-off collar is actuated using a pneumatic apparatus.

6. The system according to claim 1, wherein the shut-off collar is actuated using one of a hydraulic, pneumatic, electromechanical, and mechanical apparatus.

7. The system according to claim 1, wherein a locating ring is disposed between the anti-drool mechanism and the injection molding machine, the locating ring configured to allow the machine nozzle to pass therethrough and to guide the movement of the shut-off collar.

8. The system according to claim 1, wherein the melt passage of the anti-drool mechanism is divided into multiple melt passages adjacent to the manifold melt inlet.

9. The system according to claim 1, wherein the machine nozzle injects the melt stream into a cold runner system.

10. The system according to claim 1, wherein the fixed pin has a base portion that defines a melt passage there through for communicating the melt stream from the melt passage of the anti-drool mechanism to the melt inlet of the manifold.

11. An injection molding system comprising:
an injection molding machine including a retractable machine nozzle for selectively engaging an anti-drool mechanism, wherein the machine nozzle delivers a melt stream of moldable material to the injection molding system by engaging the anti-drool mechanism; and
a manifold having at least one manifold melt inlet downstream of the anti-drool mechanism for receiving the melt stream and at least one manifold melt channel for distributing the melt stream;
the anti-drool mechanism comprising
a melt passage;
a fixed pin disposed within the melt passage and sized so that the melt stream flows around the pin, the pin having a base portion that defines a melt channel there through for communicating the melt stream from the melt passage of the anti-drool mechanism to the melt inlet of the manifold; and
a moveable shut-off collar disposed at least partially within the melt passage of the anti-drool mechanism and surrounding the pin, wherein a sealing surface of the shut-off collar contacts a sealing surface of the pin to stop the flow of the melt stream through the anti-drool mechanism.

12. The system according to claim 11, wherein the shut-off collar is spring-loaded.

13. The system according to claim 12, wherein the shut-off collar is moved downstream by engagement with the machine nozzle such that contact between the shut-off collar sealing surface and the pin sealing surface is broken to allow the melt stream to flow through the anti-drool mechanism.

14. The system according to claim 11, wherein engagement of the retractable machine nozzle with the shut-off collar causes the shut-off collar to retract and allow flow of the melt stream between the machine nozzle and the melt passage of the anti-drool mechanism.

15. The system of claim 11, wherein the pin has a head portion that is received within the machine nozzle when the shut-off collar is moved downstream by engagement with the machine nozzle.

16. An injection molding system comprising:
an injection molding machine having an injection unit and a machine nozzle;
an injection manifold having an inlet and a plurality of melt channels, wherein the inlet receives a melt from the machine nozzle;
a sprue bushing disposed between the machine nozzle and the manifold, said sprue bushing having a melt passage that is in fluid communication with the manifold inlet;
a fixed pin having a shaft portion disposed within the sprue bushing melt passage, said fixed pin having a pin head portion on an upstream end of the shaft portion and a base portion on a downstream end of the shaft portion, wherein the base portion includes a melt channel there through; and
a shut-off collar disposed at least partially within said sprue bushing melt passage, said shut-off collar having a sealing surface, and said shut-off collar being movable between a first closed position, wherein the sealing surface makes contact with the pin head portion to prevent the melt from entering or leaving the sprue bushing melt passage, and a second open position, wherein there is substantially no contact between the pin head portion and the sealing surface to allow the melt to flow through the sprue bushing melt passage.

17. The system according to claim 16, wherein said shut-off collar is actuated by movement of the machine nozzle.

18. The system according to claim 16, wherein the pin head portion is received by the machine nozzle.

* * * * *